No. 757,210. PATENTED APR. 12, 1904.
A. F. MADDEN.
APPARATUS FOR MAKING GRIDS FOR SECONDARY BATTERY PLATES.
APPLICATION FILED APR. 11, 1903.
NO MODEL. 3 SHEETS—SHEET 1.
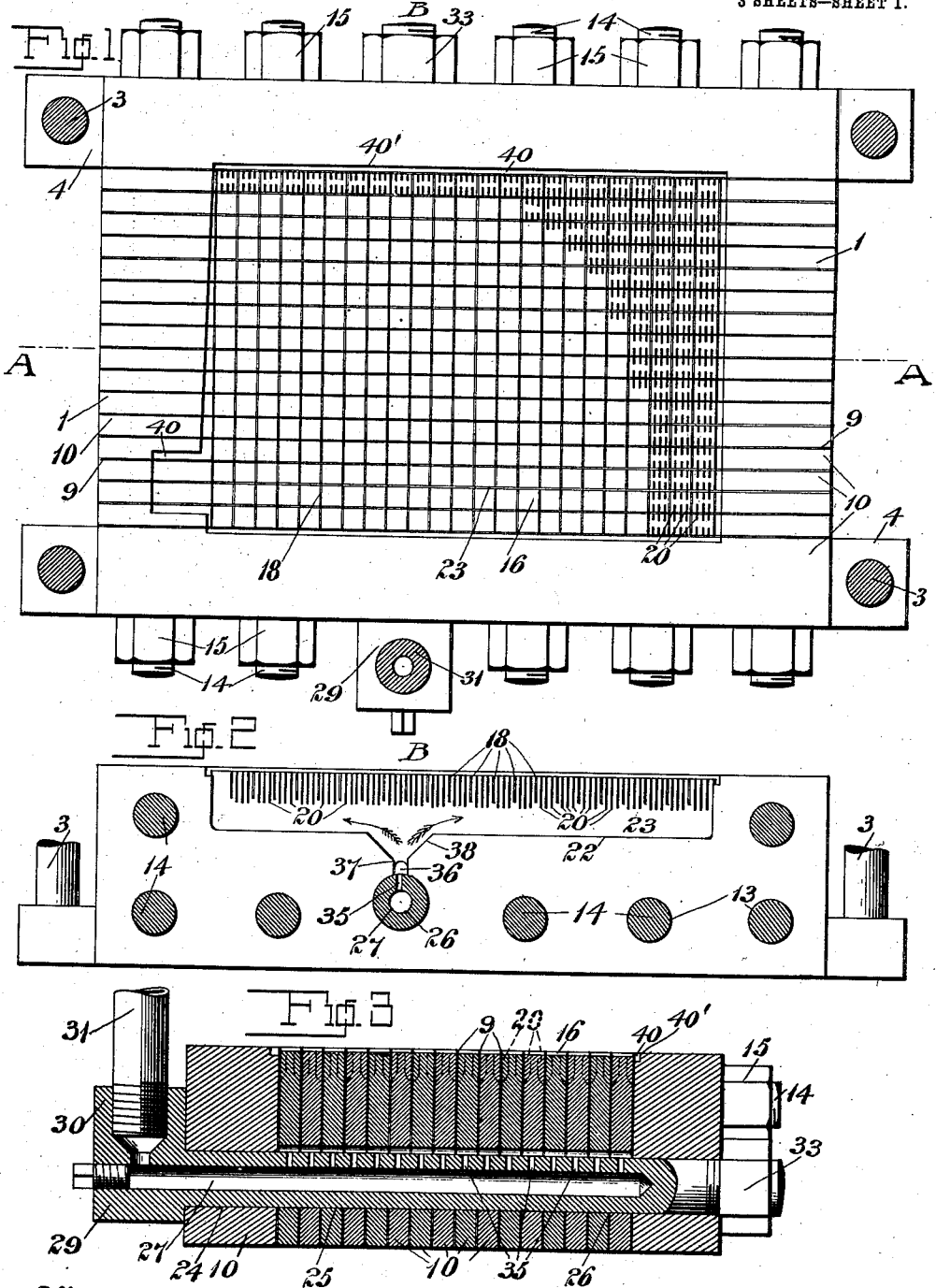

No. 757,210. PATENTED APR. 12, 1904.
A. F. MADDEN.
APPARATUS FOR MAKING GRIDS FOR SECONDARY BATTERY PLATES.
APPLICATION FILED APR. 11, 1903.
NO MODEL. 3 SHEETS—SHEET 2.
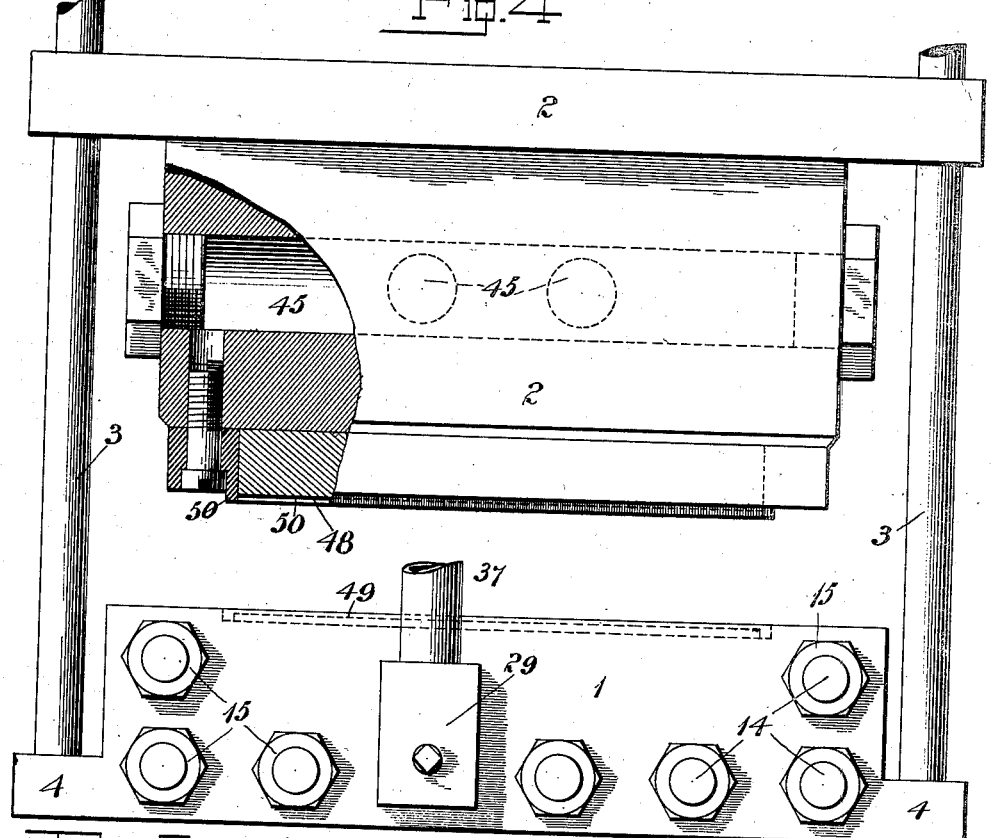
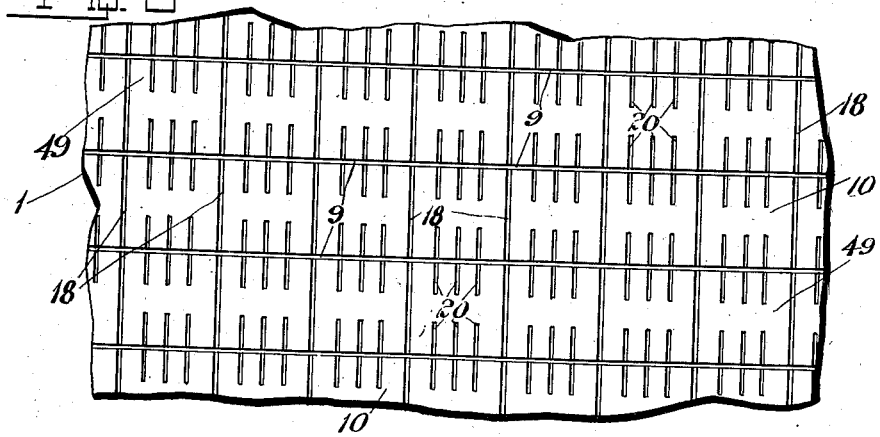

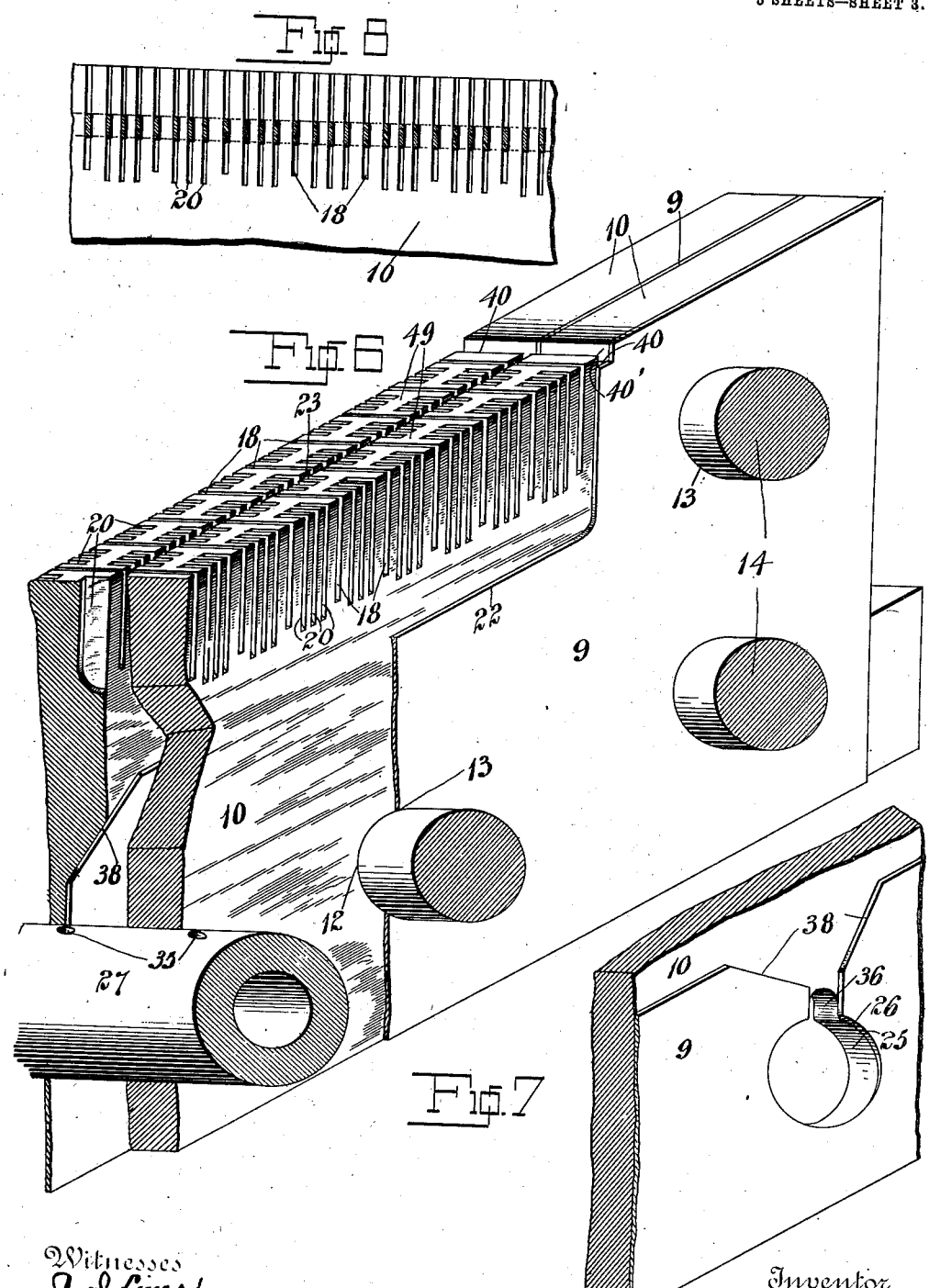

No. 757,210.

Patented April 12, 1904.

UNITED STATES PATENT OFFICE.

ALBERT F. MADDEN, OF NEWARK, NEW JERSEY, ASSIGNOR, BY MESNE ASSIGNMENTS, TO THE ELECTRIC STORAGE BATTERY CO., OF PHILADELPHIA, PENNSYLVANIA, A CORPORATION OF NEW JERSEY.

APPARATUS FOR MAKING GRIDS FOR SECONDARY-BATTERY PLATES.

SPECIFICATION forming part of Letters Patent No. 757,210, dated April 12, 1904.

Application filed April 11, 1903. Serial No. 152,155. (No model.)

*To all whom it may concern:*

Be it known that I, ALBERT F. MADDEN, a citizen of the United States, residing at Newark, in the county of Essex and State of New Jersey, have invented certain new and useful Improvements in Apparatus for Making Grids for Secondary-Battery Plates, of which the following is a specification.

My invention relates to certain new and useful improvements in machines for making (preferably from lead or a suitable alloy) grids such as are used to form or constitute part of the electrodes of secondary batteries or accumulators. It is important that such grids be made with as great as possible an expanse of surface and as complete as possible ramifications of the conducting material to all parts of the grid in order that a wide area of grid be exposed to the action of the forming-current or to the application of the active material and that the current may be conducted to and from all parts of the surface. I have had in view the production of a battery plate or grid having an almost infinite subdivision of the material by shelves and apertures; and the object of my invention is an apparatus designed to produce such a grid. Such apparatus comprises composite dies with suitable compressing appliances for placing the dies in proper relation to form the grids or conductors from sheets or slabs of suitable material and means for ejecting or freeing the grids from the die after they have been properly formed.

Heretofore in grid-forming apparatus many difficulties have been encountered in providing means for removing the grid from the die after it has been molded, cast, or otherwise formed. Owing to the delicate formation of secondary-battery grids, great care must necessarily be exercised in removing the grid from the die in order not to break or crack the thin partitions or distort or twist the grid, so as to render it valueless after removal. Mechanical means for removing the grids have proven ineffectual owing to the unequal adhering tendency of the grid to the mold or die and the locational distribution of the ejecting power on the grid.

In my improved method, hereinafter specifically described, but now generally referred to, I construct the forming-die of an alternate series of metal plates of different thicknesses suitably channeled transversely and longitudinally and provided with interstices for the admission of the metal in forming the grid. After the grid has been formed it is necessary to exert some force to remove it from its seated position in the die. To accomplish this, I use fluid as an ejecting element and carry it into the die by projecting a pipe transversely through the plates composing the die and forcing the fluid therethrough into the channels and interstices of the die and directly against the entire under surface of the grid. When fluid-pressure is exerted against the grid, it will be readily released from the die and follow the upward movement of the upper die until wholly disengaged from the forming-die, whereupon the fluid-pressure will cease and the normal condition and relation of the dies will be resumed.

My present invention comprehends certain novel combinations and organizations of instrumentalities hereinafter more fully described and then specifically designated in the claims.

In the drawings, Figure 1 is a plan view of the lower or grid-forming die. Fig. 2 is a longitudinal vertical section on the line A A, Fig. 1. Fig. 3 is a transverse vertical section of the die on a line through the liquid-supply pipe. Fig. 4 is an elevation of the upper and lower dies in position to be operated. Fig. 5 is an enlarged detail of a portion of the lower-die face. Fig. 6 is an enlarged perspective detail of a portion of the lower die. Fig. 7 is a perspective detail side view of a portion of one of the die-plates. Fig. 8 is a modified form.

In the construction and practical application of the apparatus any suitable means may be employed to operatively control the opposing dies. The lower die is indicated at 1 and the upper die at 2, said upper die being vertically slidable on stanchions 3, which are secured to frames 4, comprising part of the constructive elements of the lower die.

The organization of the under die constitutes a most important part of the present invention and is contradistinguished from my former patented apparatus in that the grid is formed wholly by the under die and a fluid element used as a means for ejecting or releasing the grid from the die instead of mechanical means or appliances, thus insuring the removal of the grid with comparative ease without buckling or cutting or otherwise injuring it. To produce a battery plate or grid that will have the largest possible area of homogeneous conductive surface in most intimate contactual relations with all portions of the active material and with the electrolyte, is most desirable.

The lower die is preferably composed of alternating series of steel bars 10 and plates 9, of any suitable material—such as copper, mica, or the like—arranged side by side and securely bound together in the desired position between said bars 10. The steel bars and copper plates are of the same length, but of different depths, the steel bars also being thicker than the copper plates and constitute the main body of the die upon which the grid is formed. The steel bars are provided with transverse holes 12, that register with similar holes 13 in the copper plates and through which tie-bolts 14 pass and are engaged by nuts 15 on the outer sides of the side bars 10, securely binding together in its entirety the parts composing the lower die. When the die is assembled, as shown in Figs. 1 and 3, a depression 16 occurs in the face of the die that is of the same configuration as the blank plate to be operated upon to form the grid. These two facial planes of the under die are engaged by corresponding inverse planes on the upper die. Transverse vertical channels 18 of suitable depth and terminating against the side bars 10 are cut in the upper sides of the steel bars, into which the metal of the blank grid is forced and into which fluid is admitted to eject the grid, as will hereinafter be more fully explained. By employing copper or other soft-metal plates between the steel bars it becomes possible to make the die non-leakable when the fluid is admitted to the channels and interstices to eject the grid. Arranged longitudinally along the steel bars between the transverse channels 18 are vertical interstices 20, which are adapted to form projections on the grid to assist in retaining the active matter on the grid. Imposed between the steel bars are copper or other suitable soft-metal plates 9, that are cut away, as shown at 22, to form longitudinal channels 23 between the steel bars. The extreme ends of the copper plates, as shown in Fig. 6, extend upwardly to the highest facial plane of the die in order to present an unbroken surface around the depression 16. The opposing dies are here termed "upper" and "lower" dies for the purpose of distinguishing them; but it should be understood that they can be arranged in opposite relation, if desired.

Extending transversely through openings 24, 25, and 26 in the side bars, steel bars, and copper plates is a pipe 27, which is adapted to supply the ejecting fluid to the die. It has been demonstrated by experiment that a mixture of oil and water produces the best fluid for ejecting purposes. The ends of the pipe 27 are closed, and on one end of the said pipe is a head 29, having a radial opening 30, into which is tapped a main supply-pipe 31 for supplying the fluid to the die, and on the opposite end of the pipe 27 is threaded a nut 33, which engages the side bars 10 to retain the supply-pipe in its proper position, as shown in Fig. 3. The fluid-supply pipe 27 has a number of radial springs 35 in the top thereof through which the fluid flows into a groove or channel 36, which is formed by notches 37, cut in the steel bars above the supply-pipe 27. By referring to Figs. 2 and 6 it will be noticed that the copper plates are cut away, as shown at 38, in order to permit the fluid to enter the channels 23 between the steel bars. Thus it will be seen that when the fluid is placed under pressure it will flow through the openings 35 into the channel 36 and thence into the longitudinal and transverse channels and also into the interstices in the steel bars and be equally distributed against the under surface of the grid for the purpose of ejectment.

The frame of the grid is formed by having a marginal depression 40 in the body of the lower die of greater depth than the depression 16 and having the outer wall or shoulder 40', surrounding the said depression 40, corresponding with the marginal form of both the blank and the finished grid, as shown in Fig. 1.

The upper die is slidably mounted on stanchions 3 and any suitable means employed to operatively control its action with relation to the under die; but inasmuch as such mechanism forms no part of my present invention it has not been illustrated. The upper die is provided with horizontal heat-chambers 45 of any suitable cross-section, into which heat is introduced either by Bunsen burner or other suitable heating appliances. The upper die is allowed to assume a temperature just sufficient to cause the blank plate when the die engages it to assume a comparatively soft and plastic condition, thereby permitting the metal to be equally forced or distributed into the channels and interstices of the lower die, assuring compression of the entire grid or plate to practically a perfect uniform homogeneity throughout its whole structure. The face 48 of the upper die engages the face 49 of the lower die, and the marginal rib 50 of the upper die enters the depression 40 in the lower die and assists in forming the frame of the plate or grid. The marginal rib 50 is not of sufficient depth to reach the bottom of the depression 40, and the difference between the two planes will be the thickness of the grid or plate after the opposing dies have operated on the blank plate to properly form the grid.

A thin film or fin of metal may be left on the top of the grid after formation, which materially assists in the ejecting of the grid from the die. When the fluid is forced upward through the channels and interstices in the die, it will flow under the films or fins and having more surface presented for the fluid to engage will be more quickly and readily ejected. After the grid is removed from the die the films or fins can be removed in any suitable manner without impairing its value.

Of course it is obvious that any form of grid construction can be employed, the thickness, configuration, and design being matters of choice, the blanks consisting of sheet-lead or its equivalent, either perforate or intact.

In Fig. 8 a modified form of the invention is shown, wherein a grid, having been properly formed, is allowed to remain in the channels and interstices of the lower die, so that when a blank plate is placed upon the lower die to be formed it will upon the operation of the opposing die be driven into the channels and interstices and in contact with the first grid. The fluid under pressure will force the under grid upward, carrying with it the newly-formed grid, until it is ejected from the die, whereupon the fluid-pressure will cease and the lower grid remain in the die for a similar subsequent operation. The main object of this modified form is to have the channels and interstices filled by metallic matter to more completely hold the ejecting fluid in subjection.

The operation of my invention is as follows: A sheet or blank of lead previously rolled or molded and about one-eighth of an inch in thickness and having the desired marginal contour is placed on the die 1, and the upper or opposing die 2 is by suitable means forced into engagement with the metal blank on the lower die. The upper die is heated to a temperature sufficient to maintain a plastic but not molten condition of the metal blank, which will cause the metal of the blank to more readily enter the longitudinal and transverse channels and interstices in the lower die when the desired limit of pressure is exerted on said upper die. When the upper die has descended the limit of its movement, the metal of the blank will be equally distributed in the channels and interstices of the lower die, and the marginal frame of the grid will be formed in the depression 40 in the lower die by the marginal rib 50 on the opposing die. The grid now being formed, the upper die starts to recede to its initial position, and the ejecting fluid, which pervades all the channels and interstices in the lower die, is placed under pressure, which will cause it to rise in the channels and interstices and be equally distributed against the entire under surface of the grid. While the upper die is being slowly withdrawn from engagement with the lower die the pressure of the fluid will cause the grid to follow the retreating upper die until said grid has been ejected from the channels and interstices of the lower die, after which the fluid-pressure will cease and the fluid allowed to recede to its initial condition preparatory to a subsequent operation.

By organizing and operating the dies in the manner herein set forth and utilizing fluid as an element for ejecting the grids after they are formed enables me to make a battery-grid or plate having very delicate structure giving maximum conductivity with minimum weight. Furthermore, all parts of the grid or plate are homogeneously compressed, thus giving practically uniform conductivity throughout the entire electrode either for the Planté method or to all parts of filling material which may be used in the latticed openings and between the multifingered projections of the grid or plate. Physical and mechanical imperfections, marginal disintegration, distortion of the grid when ejected, and other undesirable features of grid-forming are entirely eradicated in the present method of forming and ejecting the grid.

Having thus described my invention, the following is what I claim as new therein and desire to secure by Letters Patent:

1. In apparatus of the character described, a grid-forming die provided with channels and interstices in which the grid is formed and means through which fluid is admitted to said channels and interstices to eject the grid from the die.

2. In apparatus of the character described, a composite grid-forming die constructed of immovable parts, and provided with channels and interstices projecting below the facial plane of the die for the reception of the grid-forming metal, and means for supplying fluid to the channels and interstices of the die for the purpose of ejecting the grid after it has been formed.

3. In apparatus of the character described, a plurality of hard-metal bars having interstices and channels cut therein, a plurality of soft-metal plates interjacent and contiguous to the metal bars adapted to form channels between said bars, and means for conveying fluid to the channels and interstices of the assembled die, for the purpose explained.

4. In apparatus of the character described, a grid-forming die composed of alternate series of steel bars provided with transverse channels and interstices and soft-metal plates arranged to form longitudinal channels, means for binding the bars and plates together, and means for admitting fluid to the channels and interstices, for the purpose explained.

5. In apparatus of the character described, a die whose component grid-forming elements are a series of hard-metal bars, provided with channels and interstices projecting below the facial plane of the die, and a series of soft-metal plates arranged in alternate relation with the said bars and cut away below the facial plane of the die to form longitudinal channels, means for securing the bars and plates in contiguous relation, and a pipe forming part of the assembled die and provided with openings for admitting fluid into the channels and interstices, for the purpose explained.

ALBERT F. MADDEN.

Witnesses:
J. GREEN,
WM. A. COURTLAND.